US011883696B2

(12) United States Patent
Herrmann et al.

(10) Patent No.: US 11,883,696 B2
(45) Date of Patent: Jan. 30, 2024

(54) HOUSING FOR A CLOSED-CIRCUIT BREATHING APPARATUS

(71) Applicant: Dräger Safety AG & Co. KGaA, Lübeck (DE)

(72) Inventors: Johannes Herrmann, Ahrensburg (DE); Christian Ulbrich, Hamburg (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 653 days.

(21) Appl. No.: 16/227,505

(22) Filed: Dec. 20, 2018

(65) Prior Publication Data

US 2019/0192886 A1 Jun. 27, 2019

(30) Foreign Application Priority Data

Dec. 21, 2017 (DE) ..................... 10 2017 011 908.2

(51) Int. Cl.
*A62B 9/04* (2006.01)
*A62B 7/02* (2006.01)
*A62B 9/00* (2006.01)

(52) U.S. Cl.
CPC .................. *A62B 9/04* (2013.01); *A62B 7/02* (2013.01); *A62B 9/00* (2013.01)

(58) Field of Classification Search
CPC ......... A62B 9/04; A62B 9/00; A62B 7/00–14; A62B 25/00; A61M 16/00; A61M 16/042; A61M 16/08–0891; A61M 16/0463; A61M 39/10; A61M 39/1011; A61M 39/105; A61M 39/12; A61M 2039/1022; A61M 2039/1077
USPC ...................................... 128/204.18; 285/319
See application file for complete search history.

(56) References Cited

U.S. PATENT DOCUMENTS 2,951,714 A * 9/1960 Carlberg ................ A47L 9/242 285/317
4,062,356 A * 12/1977 Merrifield ................ A62B 7/04 128/205.22
4,154,234 A * 5/1979 Baker ...................... A62B 7/08 128/205.12

(Continued)

FOREIGN PATENT DOCUMENTS

AU 2016259285 A1 12/2016
CN 1104918 A 7/1995

(Continued)

*Primary Examiner* — Tu A Vo
*Assistant Examiner* — Kelsey E Baller
(74) *Attorney, Agent, or Firm* — McGlew and Tuttle, P.C.

(57) ABSTRACT

A housing (10) for a closed-circuit breathing apparatus (100) is provided for mounting respirator components (110) in an interior (40) thereof. The housing (10) includes a housing mount (20) and a housing cover (30) for covering the interior (40). The housing mount (20) has a first partial section (52) of at least one passage opening (50) for passage of a breathing tube (120) into the interior (40). The housing cover (30) has a second partial section (54) of this passage opening (50). The housing mount (20) and/or the housing cover (30) further have/has a fastening section (60) for the mechanical fastening to a counter-fastening section (122) of the breathing tube (120), which breathing tube (120) is guided through the passage opening (50).

17 Claims, 5 Drawing Sheets

(56) References Cited

U.S. PATENT DOCUMENTS

| | | | | |
|---|---|---|---|---|
| 4,440,166 | A * | 4/1984 | Winkler | A62B 7/10 128/202.22 |
| 4,879,996 | A * | 11/1989 | Harwood, Jr. | A62B 7/10 128/202.26 |
| 5,407,236 | A * | 4/1995 | Schwarz | F16L 25/0045 285/23 |
| 6,575,165 | B1 * | 6/2003 | Cook | A62B 18/006 128/205.27 |
| 9,868,001 | B2 * | 1/2018 | Walker | A62B 18/10 |
| 10,456,547 | B2 * | 10/2019 | Miller | A61M 16/08 |
| 2003/0003003 | A1 | 1/2003 | Leonard | |
| 2003/0212385 | A1 | 11/2003 | Brenner et al. | |
| 2005/0135955 | A1 | 6/2005 | Iversen et al. | |
| 2006/0042629 | A1 * | 3/2006 | Geist | A61M 16/06 128/206.24 |
| 2006/0201509 | A1 * | 9/2006 | Forsyth | A62B 7/08 128/204.26 |
| 2007/0131228 | A1 * | 6/2007 | Croll | F04D 29/4246 128/204.15 |
| 2007/0193580 | A1 * | 8/2007 | Feldhahn | A61M 16/0066 128/204.18 |
| 2009/0095300 | A1 * | 4/2009 | McMorrow | A61M 16/0045 128/205.12 |
| 2010/0000538 | A1 * | 1/2010 | Edwards | A61M 16/08 128/205.25 |
| 2012/0037160 | A1 | 2/2012 | Sung | |
| 2014/0074046 | A1 | 3/2014 | Dulong et al. | |
| 2018/0140874 | A1 * | 5/2018 | Schuler | A62B 21/00 |
| 2021/0298370 | A1 * | 9/2021 | Watters | A41D 13/0025 |
| 2021/0315297 | A1 * | 10/2021 | Brady | A62B 23/02 |
| 2022/0001218 | A1 * | 1/2022 | Popov | A62B 9/003 |

FOREIGN PATENT DOCUMENTS

| | | | |
|---|---|---|---|
| CN | 204428596 | U | 7/2015 |
| CN | 108671437 | A | 10/2018 |
| WO | 2012/073024 | A2 | 6/2012 |
| WO | 2014/184377 | A2 | 11/2014 |
| WO | 2018/014999 | A1 | 1/2018 |

* cited by examiner

HOUSING FOR A CLOSED-CIRCUIT BREATHING APPARATUS

CROSS REFERENCE TO RELATED APPLICATIONS

This application claims the benefit of priority under 35 U.S.C. § 119 of German Application 10 2017 011 908.2, filed Dec. 21, 2017, the entire contents of which are incorporated herein by reference.

TECHNICAL FIELD

The present invention pertains to a housing for a closed-circuit breathing apparatus (also known by the acronym CCBA) for the mounting of respirator components in an interior, to a closed-circuit breathing apparatus with such a housing as well as to a process for the assembly of such a closed-circuit breathing apparatus.

BACKGROUND

It is known that closed-circuit breathing apparatuss are used to guarantee breathing protection for the user of such a respirator over a longer period of time. For this, the breathing air is guided in a closed circuit and, on the one hand, purified by respirator components, and fed back to the user of the respirator in the purified form. In addition, a metered addition of fresh oxygen or fresh breathing air takes place as part of the respirator components. In this connection, the essential respirator components are, on the one hand, a purification component, which may be configured, for example, in the form of a component for binding $CO_2$. Another respirator component is usually a cooling component for cooling breathing air guided in the closed circuit. In order to close the closed circuit for the user of the respirator, two breathing tubes are usually provided, which are used for the supply air from the respirator components to the mouth of the user and for the exhaust air from the mouth of the user to the respirator components of the respirator.

One drawback of the prior-art solutions is that the fastening between the breathing tubes and the respirator components is exposed to high stresses. Thus, the connections between the breathing tubes and the respirator components are primarily used to guarantee a fluid-tight connection of the closed breathing circuit to the respirator components via the breathing tubes. In addition, this connection must, however, also fulfill a mechanical functionality, namely a mechanical stability for removing mechanical load forces from the breathing tubes to the respective connection to the breathing component. In the prior-art solutions, this leads to a relatively higher mechanical effort having to be made on the respirator components for mechanical stabilization in this area of application. Last but not least, the configuration of the breathing tube is also provided with a higher complexity in this way in order to be able to guarantee the desired mechanical stability.

SUMMARY

An object of the present invention is to at least partly eliminate the drawbacks described above in a cost-effective and simple manner. In particular, the object of the present invention is to guarantee a mechanical protection of the respirator components in a cost-effective and simple manner at identical or improved functionality of the closed-circuit breathing apparatus.

According to the present invention, a housing for a closed-circuit breathing apparatus is equipped for the mounting of respirator components in an interior. For this, the housing has a housing mount and a housing cover for covering the interior. The housing mount is equipped with a first partial section of at least one passage opening, which is intended for the passage of a breathing tube into the interior of the housing. The housing cover has a second partial section of this passage opening and especially closes the passage opening and thus the first partial section. The housing mount and/or the housing cover are/is further equipped with a fastening section for the mechanical fastening to a counter-fastening section of the breathing tube guided through the passage opening.

According to the present invention, the housing is configured for absorbing mechanical loads. Forces, which are transmitted via the breathing tube, for example, when the user moves, may now be introduced into the housing via the correlation and the fastening between the counter-fastening section and the fastening section. The fastening section in this case is preferably used exclusively for mechanical fastening and may be configured separately in this way by a fluid-tight connection or by a sealing section between the breathing tube and a respirator component. Thus, it becomes possible to introduce the removal of tensile forces from the breathing tube directly into the housing and in this way to achieve a mechanical uncoupling for the respirator components. On the one hand, this leads to increased stability of the entire system of the housing or of the closed-circuit breathing apparatus. Another advantage is that the mechanical stability may essentially be guaranteed in this way independently of the breathing tube, so that this breathing tube can be configured with identical or even higher stability in a simple and cost-effective manner. Last but not least, the respective respirator component, to which the breathing tube shall be connected in a fluid-tight manner, is also relieved of any mechanical load and is in this way stabilized or protected.

In addition to the advantage of the mechanical stabilization via the housing and the corresponding removal of tensile loads, another advantage is achieved. Because the fastening section is configured as a positive-locking section, as it will be explained in detail later, preferably circumferentially and independently of the respirator component arranged in the interior, a primary sealing functionality may be provided here. Due to the correlation between the fastening section and the counter-fastening section, it thus becomes possible that a sealing is achieved not as a fluid-tight sealing due to the fastening, but a sealing against the penetration of fire, glowing particles or contaminants during the use of the closed-circuit breathing apparatus.

Based on the above considerations, it is thus possible to achieve, on the one hand, a mechanical stabilization due to the introduction of tensile loads directly into the housing and, on the other hand, an additional protection of the respirator component due to a sealing against particles by means of the mechanical fastening. A housing according to the present invention is thus used to increase the safety during the use of the closed-circuit breathing apparatus and at the same time to protect the individual components against overloading. This may especially lead to the individual components being able to have a configuration that has a lighter weight, is more cost-effective and uses less material.

It may be advantageous when in case of a housing according to the present invention, the fastening section is configured as a positive-locking section for fastening to the counter-fastening section of the breathing tube, which fastening is positive locking in at least some sections. Positive locking is especially defined as meshing and/or enclosing of the fastening section with the counter-fastening section. In this connection, it is preferable when the fastening section is formed circumferentially all around the passage opening and thus also circumferentially all around the breathing tube. The use of a positive-locking section as fastening section implies, in addition, the described protection against the penetration of fire or mechanical or glowing particles in a simple and cost-effective configuration. A protection against contaminants is also quasi automatically guaranteed in a cost-effective manner in this way. The formation of a positive locking is, in addition, an especially simple and fast assembly possibility and reduces the complexity of the individual components and avoids a high number of individual components. The advantages according to the present invention can thus be achieved in an even simpler, faster and improved manner.

It may likewise be advantageous when in case of a housing according to the present invention, the fastening section is especially formed circumferentially all around or essentially all around the passage opening on the housing mount and on the housing cover. In its division into housing mount and housing cover, the fastening section makes it possible to provide an improved and more stable fastening. Thus, it becomes possible to introduce the corresponding tensile loads generated from the breathing tube both into the housing mount and into the housing cover via the fastening section, which has a double configuration. Since a circumferential configuration is preferably provided at the passage opening for the fastening section, a circumferential and especially symmetrical removal of the tensile loads generated into the housing especially also becomes possible. A load on one side, which would be associated with stabilization of the breathing tube and/or the housing on one side, can in this way be avoided effectively and above all in a cost-effective manner. Moreover, rotation-free assembly becomes possible due to the all-around fastening as well. The breathing tube can thus be freely inserted into the fastening section or passage opening quasi independently of its rotatory relative position and fastening can thus be provided faster, simpler and with lower complexity.

Another advantage may be when in case of a housing according to the present invention, the second partial section has a smaller configuration on the housing cover than the first partial section on the housing mount. Hence, this is an asymmetrical separation with the partial sections of the passage opening having different sizes. The second partial section is configured in this case especially in the range of less than about one-fourth of the circumferential section of the passage opening, while the first partial section correspondingly adds up to more than about three-fourths of the circumference of the passage opening. The second partial section may hereby have, for example, a linear or essentially linear, essentially barrier-like configuration. With its larger configuration, the first partial section may have, for example, a U-shaped or an essentially U-shaped configuration, and be formed on the housing mount. The asymmetrical division now makes it possible for the first partial section to already guarantee a prefixing due to the enlarged configuration. Insertion of the breathing tube into the first partial section is thus possible for prefixing or prefastening already before closing the cover. For closing the housing cover and thus for completing the passage opening by means of the second partial section, it is now sufficient for this prefixing to hold the breathing tube in this preliminary position. Thus, the user or assembler of a housing according to the present invention has both hands free in order to arrange and fasten the housing cover in the desired covered position in an as clamp-free or crimp-free manner as possible for the breathing tube.

Another advantage can be achieved when the separation of the passage opening into the first partial section and the second partial section is configured as off-center in relation to a passage axis of the passage opening in case of a housing according to the present invention. As it was explained in the above paragraph, this is especially correlated with the asymmetrical separation. Here again, a preferred configuration is a linear second partial section and/or a first partial section preferably having a U-shaped configuration for the already explained prefixing. Another advantage of the off-center separation of the passage opening is that due to the prefixing in the larger first partial section quasi an automatic avoidance of crimping or clamping of the breathing tube is provided during the closing of the housing cover. Because the housing cover only closes the passage opening from above in the sense of a barrier, an effective protection against clamping can quasi automatically be provided.

It is likewise advantageous when in case of a housing according to the present invention the passage opening is arranged in a projecting section which projects from an outer housing wall of the housing cover and/or of the housing mount. In this connection, the housing wall is essentially the closing of the interior from the surrounding environment and is provided or formed, on the one hand, by the housing mount and, on the other hand, by the housing cover. If the passage opening in this case protrudes outwards from this enclosing housing wall by means of the projecting section, then easier access becomes possible. In this case, a correlation is especially given that the projecting section protrudes further than the usual finger width of a human hand. Thus, during the preassembly or during the carrying out of the individual assembly steps, easier access for the assembler can thus be guaranteed during the insertion of the breathing tube into the passage opening.

It is likewise advantageous when the passage opening has a radial projection outwards from the fastening section circumferentially in at least some sections in a housing according to the present invention. This radial projection has a preferably constant or essentially constant configuration in the first partial section and/or in the second partial section, so that reaching the final and desired preassembly position for the breathing tube can also clearly be visually seen in the case of central insertion during the assembly. Easier handling is guaranteed in this case as well due to the radial projection. Last but not least, the radial projection can provide an additional mechanical stability of the border of the passage opening, on the one hand, but also a corresponding support functionality in case of relative movements of the breathing tube. The mechanical stability of the housing and the breathing tube can thus consequently be even further improved in this way.

It may likewise be advantageous if at least two, especially identical or essentially identical passage openings are provided in the case of a housing according to the present invention. Since a closed-circuit breathing apparatus usually has at least two breathing tubes, namely the supply air to the mouth of the user and the exhaust air away from the mouth of the user, two identical or essentially identical passage openings are provided with the corresponding advantages. Both the introduction and return for both breathing tubes are thus provided with both advantages according to the present invention.

The subject of the present invention is likewise a closed-circuit breathing apparatus with a housing according to the present invention. In this case, at least one respirator component is mounted in the interior and is connected in a fluid-communicating manner to a breathing tube. Further, the breathing tube is fastened to the fastening section of the housing by means of a counter-fastening section. Thus, a closed-circuit breathing apparatus according to the present invention offers the same advantages as the advantages that have been explained in detail with reference to a housing according to the present invention.

A closed-circuit breathing apparatus according to the present invention can be perfected to the effect that the breathing tube has a sealing section, by means of which the breathing tube is connected in a fluid-tight manner to the at least one respirator component. The sealing section is again geometrically and structurally separated from the counter-fastening section. Thus, the two functions of mechanical stabilization via the fastening section and the possibility of a fluid-tight connection via the sealing section are separated from one another and thus the described mechanical stabilization protection of the respirator component is also provided in a simple and cost-effective manner. In this connection, the sealing section is preferably formed at the end or at the end area of the breathing tube, so that the fastening section is arranged beforehand in order to fit the sealing section into the interior of the closed-circuit breathing apparatus and of the housing. The sealing section in this case may itself have corresponding sealing devices or sealing surfaces. However, uses of separate sealing devices in the form of O-rings or corresponding components may also be provided.

Furthermore, it may be advantageous that the breathing tube is enclosed by a fastening device, and especially in the form of a union nut, which ensures the fluid-tight connection of the at least one respirator component, in case of a closed-circuit breathing apparatus according to the present invention. This fastening device makes it possible to also guarantee mechanical stabilization for the residual mobility of the breathing tube in the interior of the housing. In this connection, the fastening device preferably does not touch the tube. If the fastening device is configured, for example, as a union nut, then this union nut may generate a conical annular gap in interaction with the sealing surface, which annular gap geometrically prevents the pulling off of the tube from the sealing surface by the gap being selected to be smaller than the thickest point of the breathing tube, which may represent a ring-shaped thickened section on the front edge in the present embodiment, which ring-shaped thickened section comes to lie in the nut of the component port in case of correct assembly. A force-neutral assembly of such a union nut is thus at the same time a control feature for a correct assembly of the breathing tube because a greater force would otherwise be necessary for assembling the union nut. The sealing action is preferably achieved solely due to the tensile stresses resulting from the undersize of the sealing tube section compared to the sealing surface of the component port.

Moreover, it is advantageous when the counter-fastening section is configured as a reinforced collar of the breathing tube in case of a closed-circuit breathing apparatus according to the present invention. Breathing tubes are usually configured as corrugated tubes for free mobility and at the same time for a resistance to collapsing. If a reinforced collar is now provided or used as a counter-fastening section in the end area of the breathing tube, this leads to rotation-free assembly, as it was already explained, becoming possible in this way in a simple and cost-effective manner.

Another subject of the present invention is a process for the assembly of a closed-circuit breathing apparatus according to the present invention, having the following steps:

- insertion of the breathing tube into the first partial section of the passage opening in the housing mount,
- formation of the fastening between the fastening section and the counter-fastening section, and
- closing of the housing with the housing cover.

Due to the configuration of a closed-circuit breathing apparatus according to the present invention, a process according to the present invention provides the same advantages as the advantages that were explained in detail with reference to a housing according to the present invention and with reference to a closed-circuit breathing apparatus according to the present invention.

Further advantages, features and details of the present invention appear from the following description, in which exemplary embodiments of the present invention are described in detail with reference to the drawings. The features mentioned in the claims and in the description may also each be essential to the present invention by themselves or in any combination. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
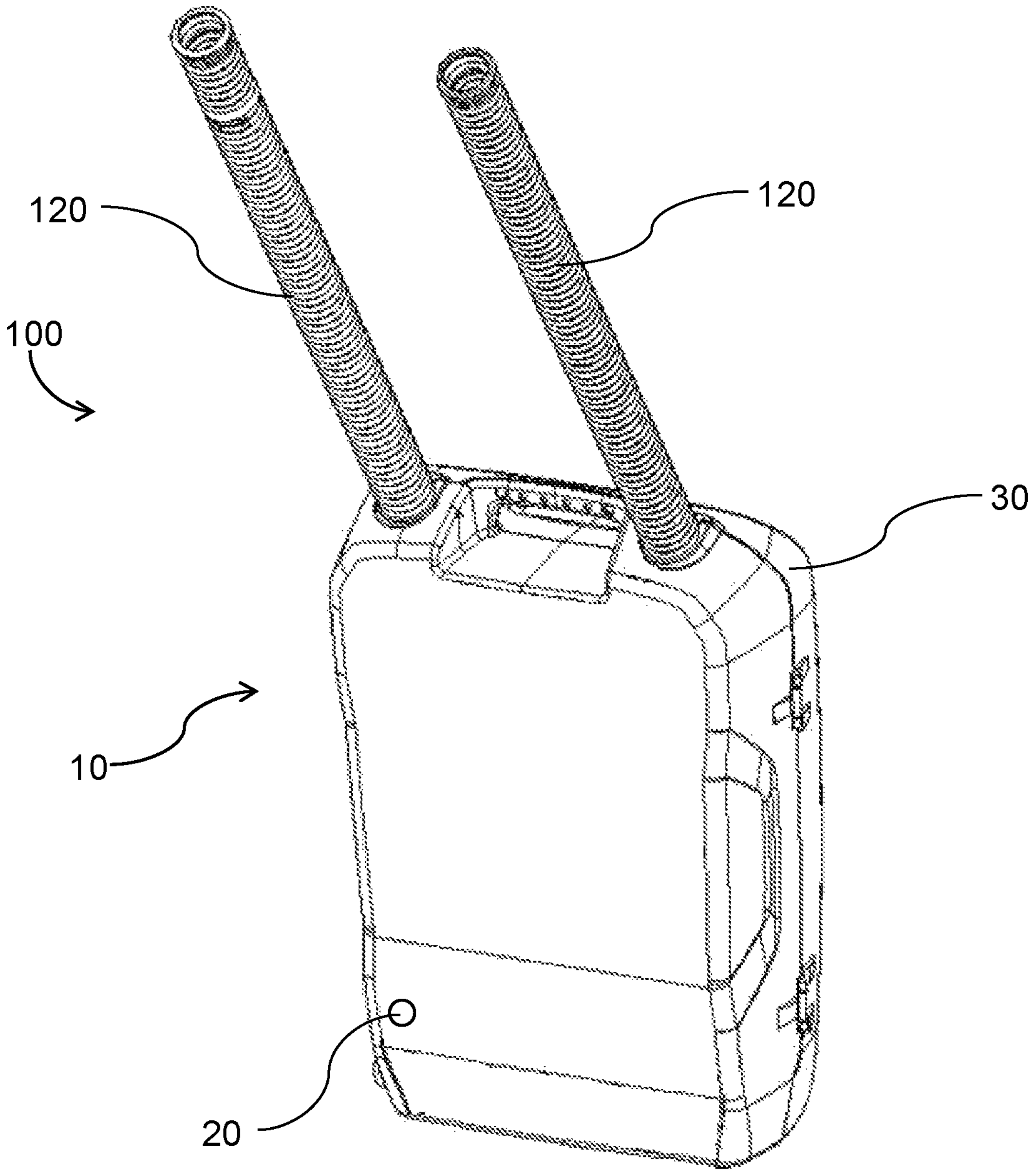
FIG. 1 is a schematic perspective view showing an embodiment of a housing according to the present invention in case of a closed-circuit breathing apparatus according to the present invention.

Referring to the drawings, FIGS. 1 through 5 show an embodiment of a housing 10 according to the present invention of a closed-circuit breathing apparatus 100 according to the present invention. FIG. 1 schematically shows the main components. The closed-circuit breathing apparatus 100 is equipped with a housing 10, which essentially forms the housing wall 12 due to a housing mount 20 and a housing cover 30. FIG. 1 schematically shows a mouthpiece, which is equipped with two breathing tubes 120 for supply and discharge of breathing air and exhaled air, respectively. The connection of the two breathing tubes 120 can be seen in more detail in FIG. 2.

Figure 2:
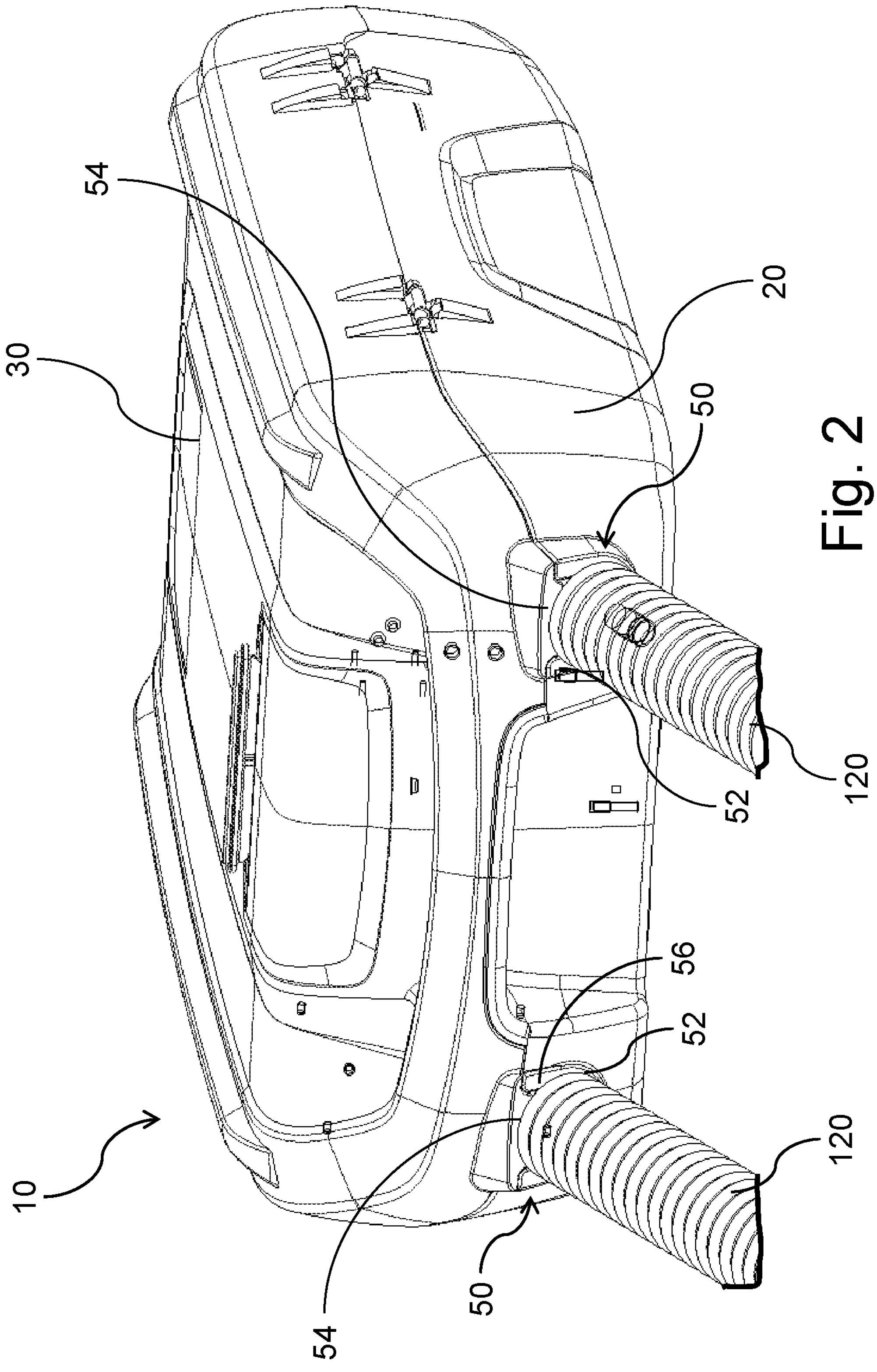
FIG. 2 is a schematic enlarged view showing the embodiment of FIG. 1.

Two passage openings 50 are arranged at the housing 10 in order to guide the breathing tubes 120 into the interior 40 of the housing 10. These passage openings 50 can be seen on both sides in FIG. 2. Both passage openings 50 have an essentially identical configuration with this embodiment and are used to ensure passage of the breathing tube 120 into the interior 40 of the housing 10. In this connection, FIG. 2 shows the closed state of the housing cover 30, so that the two passage openings 50 are completely formed and circumferentially closed by the first partial sections 52 and the second partial sections 54 of the two passage openings 50.

Figure 3:
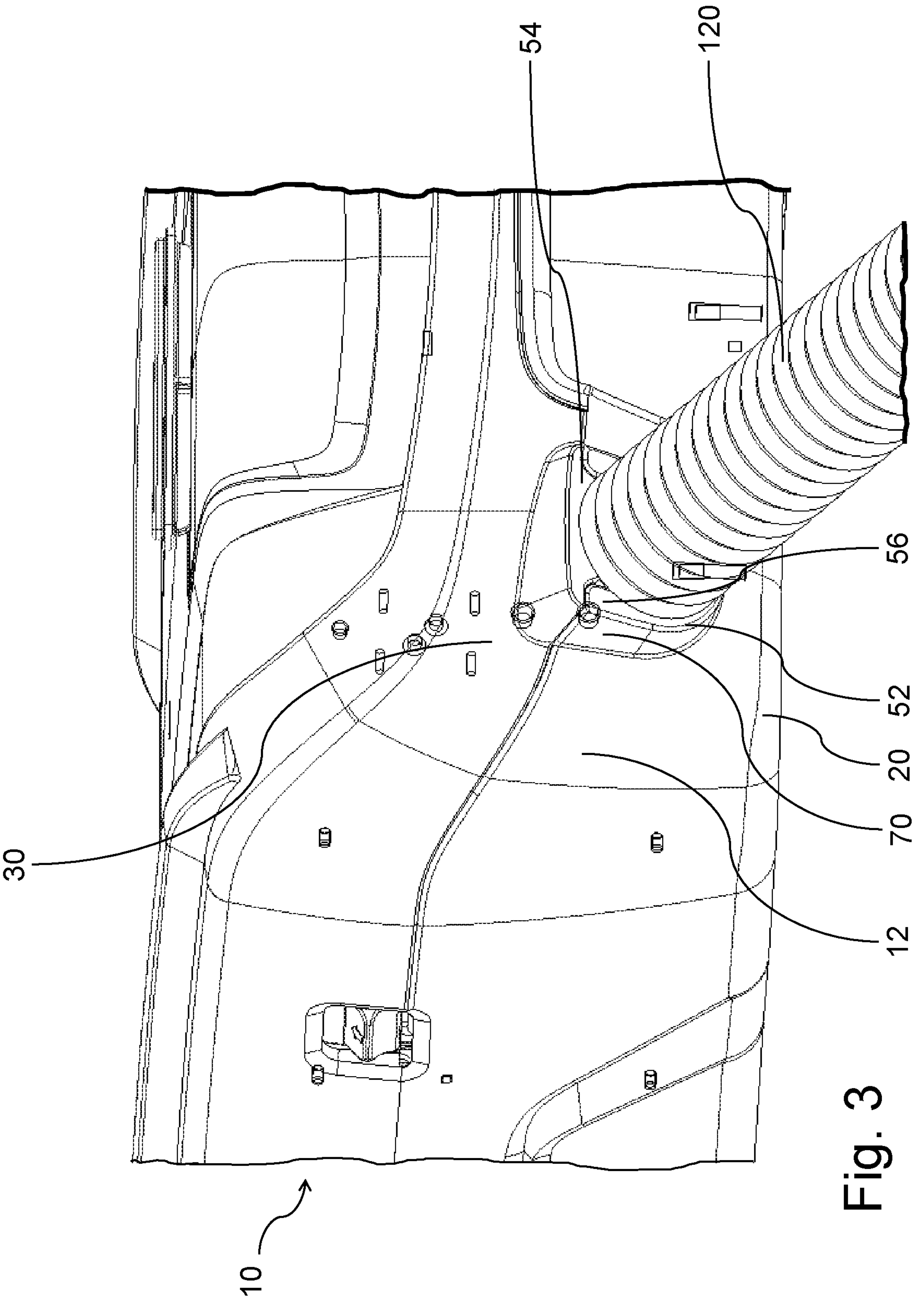
FIG. 3 is a schematic cut away partial view of the embodiment of FIGS. 1 and 2.

In a further enlarged view, FIG. 3 shows how the two partial sections 52 and 54 of the passage opening 50 correlate with one another. The second partial section 54 has an essentially linear and shorter configuration at the housing cover 30 than this is the case in the first partial section 52 of the housing mount 20. The first partial section 52 has an essentially U-shaped configuration, so that the breathing tube 120 with its counter-fastening section 122 can be inserted in a rotation-free manner into the positive-locking section of the fastening section 60 in this U-shaped manner when the housing cover 30 is opened. A projecting section 70, which provides a greater handling freedom for the hand of the assembler, is provided with this embodiment for an easier handling. In addition, a radial projection 56 is provided about the fastening section 60 for a visual recognition of the preassembly and further facilitation of the assembly.

Figure 4:
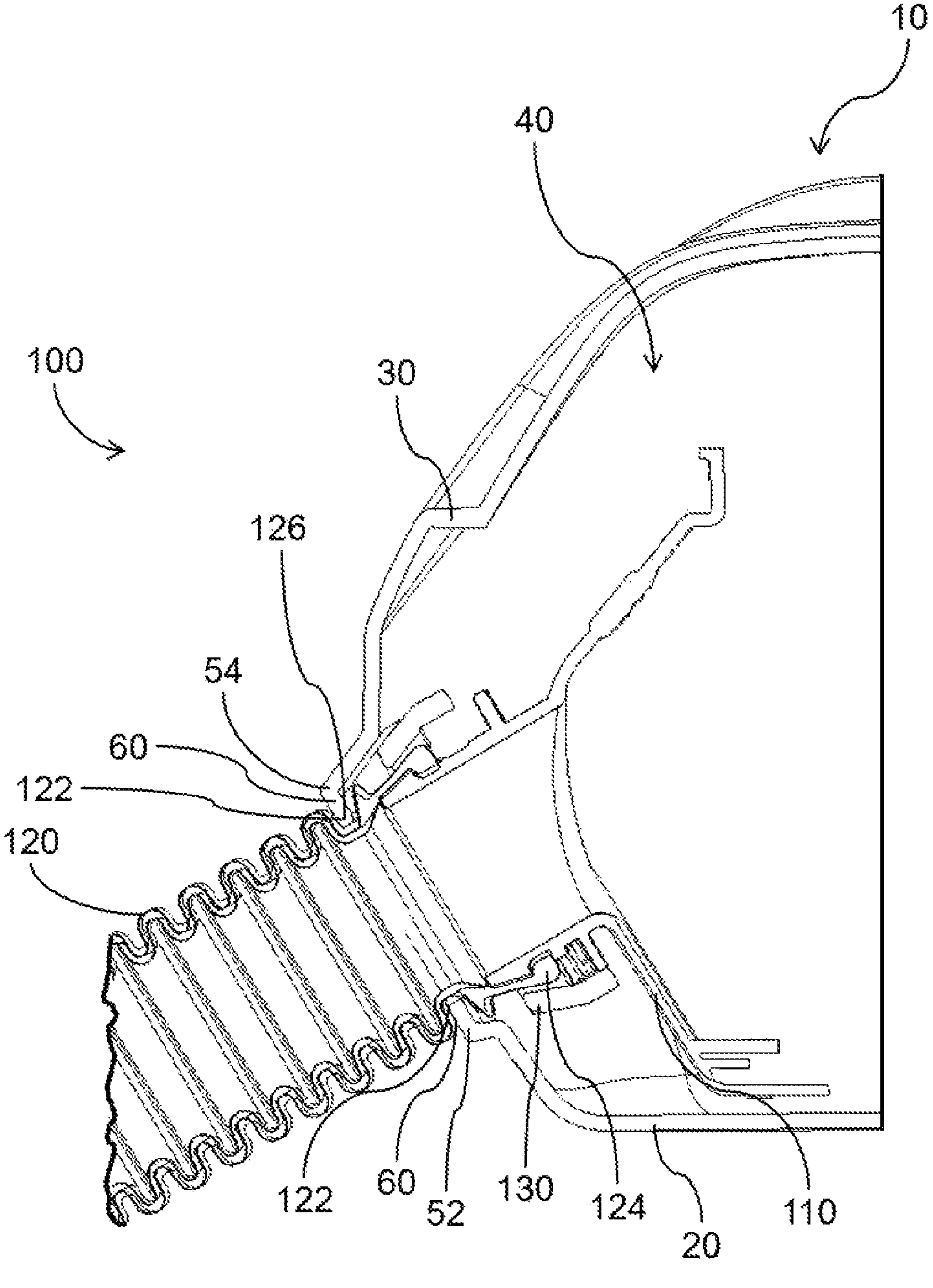
FIG. 4 is a schematic cut away partial sectional view of the embodiment of FIGS. 1 through 3.
Figure 5:
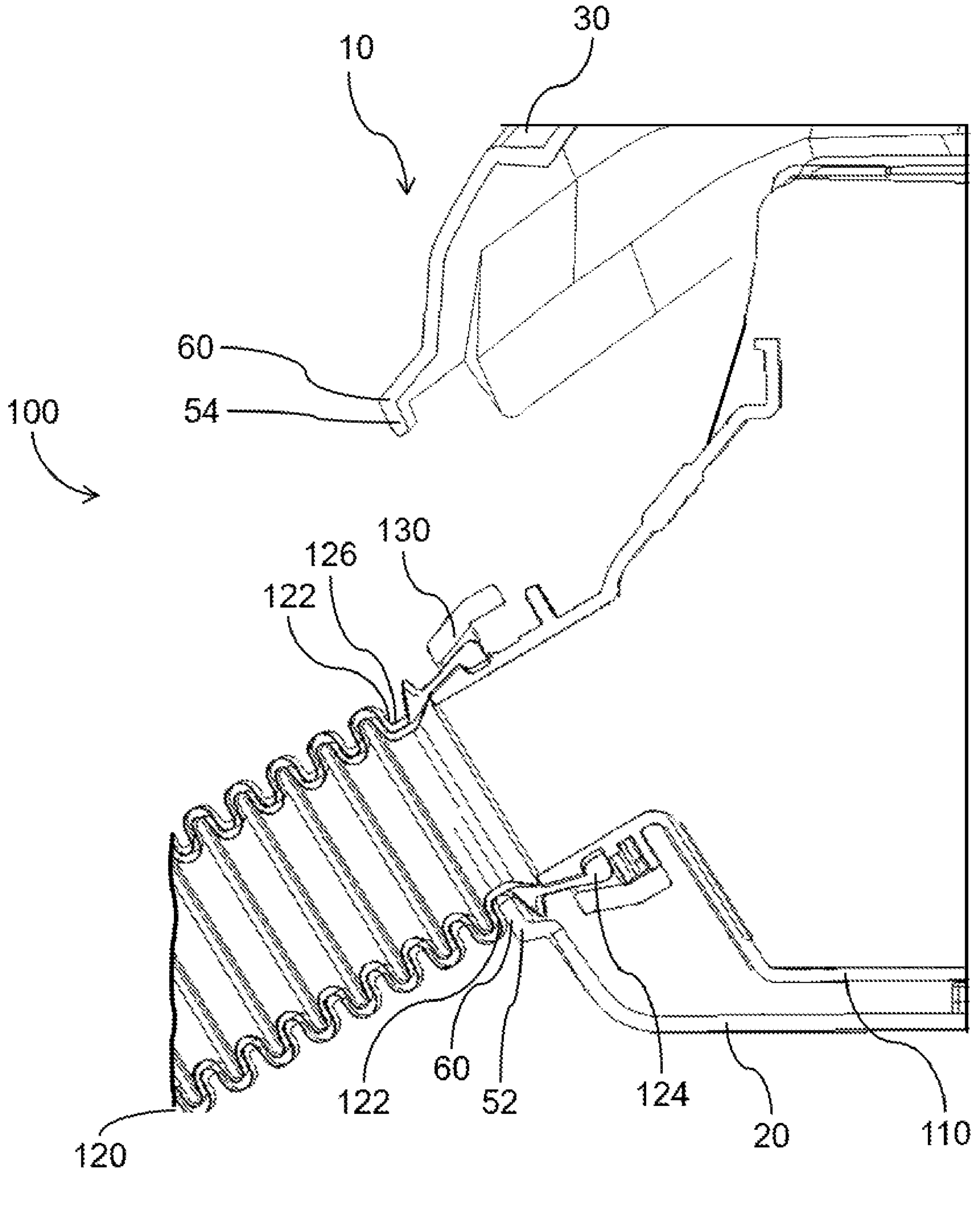
FIG. 5 is a schematic cut away partial sectional view showing the embodiment of FIGS. 1 through 4 with the housing cover opened.

FIGS. 4 and 5 schematically show how the described advantages can be achieved in case of the assembly and disassembly of a housing 10 for the closed-circuit breathing apparatus. In this case, FIG. 5 shows the opened state of the housing cover 30 and FIG. 4 shows the closed state. In this partial step, it can be readily seen that a respirator component 110 is in this case arranged in the interior 40 of the housing 10. For the fluid-communicating connection to the breathing tube 120, this breathing tube is provided with a sealing section 124 and pulled over a corresponding projection of the respirator component 110 in a sealing manner. The respirator component 110 here may have both a cooling component and a purification component. A union nut as fastening device 130 is arranged over the breathing tube 120 here for the generation of a mechanical fastening.

As soon as the housing cover 30 is opened, this fluid-tight communication via the sealing section 124 with the respirator component 110 can now be formed in a first step assembly. Subsequently or at the same time, the breathing tube 120 with its collar 126 as counter-fastening section 122 is inserted into the fastening section 60 of the passage opening 50 and in the lower area into the first partial section 52 here. FIG. 5 shows this prefixed position, which is also shown or can be designated as preassembly position. If the housing cover 30 is now closed, the second partial section 54 also meshes with the corresponding collar 126 as counter-fastening section 122 from above in a barrier-like manner and in this way completes or closes the passage opening 50 in a barrier-like manner. The positive-locking fastening is thus completely closed and is used not only for the mechanical removal of tensile loads indirectly into the housing 10, but also, in addition, for a mechanical sealing against the penetration of fire, contaminants or glowing particles.

The above explanation of the embodiments describes the present invention exclusively within the framework of examples. While specific embodiments of the invention have been shown and described in detail to illustrate the application of the principles of the invention, it will be understood that the invention may be embodied otherwise without departing from such principles.

APPENDIX

List of Reference Numbers

10 Housing
12 Housing wall
20 Housing mount
30 Housing cover
40 Interior
50 Passage opening
52 First partial section
54 Second partial section
56 Projection
60 Fastening section
70 Projecting section
100 Closed-circuit breathing apparatus
110 Respirator component
120 Breathing tube
122 Counter-fastening section
124 Sealing section
126 Collar
130 Fastening device

What is claimed is:

1. A closed-circuit breathing apparatus housing for mounting of respirator components of a closed-circuit breathing apparatus, the closed-circuit breathing apparatus housing comprising:
- a housing mount; and
- a housing cover, the housing mount and the cover cooperating to cover a housing interior, wherein:
- the housing interior is configured to receive at least one of the respirator components;
- the housing mount comprises a first partial section of at least one passage opening for passage of a breathing tube into the housing interior;
- the housing cover comprises a second partial section of said at least one passage opening;
- the housing mount or the housing cover or both the housing mount and the housing cover comprises a fastening section for mechanical fastening to a counter-fastening section of the breathing tube, which the breathing tube is to be guided through the at least one passage opening;
- the fastening section is defined by an extent of both the housing mount and the housing cover;
- the breathing tube comprises a sealing section at one end of the breathing tube configured to fluid-tightly connect the breathing tube to the at least one of the respirator components in the housing interior;
- the at least one respirator component comprises an external groove configured to receive an interior rib of the sealing section at the one end of the breathing tube;
- a union nut is arranged over the interior rib of the sealing section and the external groove of the at least one respirator component in the housing interior;
- the fastening section is configured to be located adjacent to the sealing section and at least one of a plurality of corrugations of the breathing tube;
- the fastening section is formed on the housing mount and on the housing cover circumferentially all around or essentially all around the at least one passage opening;
- at least a portion of the fastening section is attached to the breathing tube and the at least a portion of the fastening section is positioned within the counter-fastening section;

the counter-fastening section is defined by a groove that is formed between two ridges of the plurality of corrugations.

2. The closed-circuit breathing apparatus housing in accordance with claim 1, wherein:

the fastening section is configured as a positive-locking fastening section for fastening to the counter-fastening section of the breathing tube;

the positive-locking fastening section is positive-locking in at least some sections;

the fastening section comprises an inner surface defining a portion of the housing interior; and the fastening section defines at least a portion of the at least one passage opening.

3. The closed-circuit breathing apparatus housing in accordance with claim 1, wherein the second partial section on the housing cover comprises a smaller configuration than the first partial section on the housing mount, wherein a portion of the breathing tube is located in the housing interior.

4. The closed-circuit breathing apparatus housing in accordance with claim 1, wherein a separation of the first partial section and the second partial section is configured as off-center in relation to a passage axis of the passage opening.

5. The closed-circuit breathing apparatus housing in accordance with claim 1, wherein the at least one passage opening is arranged in a projecting section, which projecting section protrudes from an outer housing wall of the housing cover or of the housing mount or of both the housing cover and the housing mount.

6. The closed-circuit breathing apparatus housing in accordance with claim 1, wherein the fastening section, in at least some sections thereof, comprises a radial projection extending circumferentially outwardly, at least a portion of the breathing tube being located radially inward of the fastening section.

7. The closed-circuit breathing apparatus housing in accordance with claim 1, wherein:

the housing mount comprises another first partial section of a second passage opening for passage of another breathing tube into the housing interior;

the housing cover comprises another second partial section of said second passage opening; and said at least one passage opening and the second passage opening are identical or essentially identical passage openings.

8. A closed-circuit breathing apparatus comprising:

at least one respirator component;

a breathing tube with a plurality of corrugations and a counter-fastening section; and closed-circuit breathing apparatus housing comprising:

a housing mount; and a housing cover, the housing mount and the cover cooperating to cover a housing interior, wherein:

the housing mount comprises a first partial section of at least one passage opening for passage of a breathing tube into the housing interior;

the housing cover comprises a second partial section of said at least one passage opening;

the housing mount or the housing cover or both the housing mount and the housing cover comprises a fastening section for mechanical fastening to the counter-fastening section of the breathing tube, which the breathing tube is guided through the at least one passage opening;

the fastening section is defined by an extent of both the housing mount and the housing cover;

the at least one respirator component is mounted in the housing interior, the at least one respirator component is fluid-communicatingly connected to the breathing tube;

the breathing tube comprises a sealing section at one end of the breathing tube configured to fluid-tightly connect the breathing tube to the at least one respirator component;

the at least one respirator component comprises an external groove configured to receive an interior rib of the sealing section at the one end of the breathing tube;

a fastening device enclosing the breathing tube;

the fastening device comprises a union nut, which the union nut is arranged over the interior rib of the sealing section and the external groove of the at least one respirator and cooperates with the sealing section to provide a fluid-tight connection of the breathing tube to the at least one respirator component in the housing interior;

the fastening section is located adjacent to the sealing section and at least one of the plurality of corrugations;

the counter-fastening section of the breathing tube is fastened to the fastening section of the housing and the fastening section is positioned within the counter-fastening section; and the counter-fastening section is defined by a groove that is formed between two ridges of the plurality of corrugations.

9. The closed-circuit breathing apparatus in accordance with claim 8, wherein the counter-fastening section is configured as a reinforced collar of the breathing tube, at least a portion of the breathing tube being located radially inward of the fastening section with respect to a longitudinal axis of the breathing tube.

10. The closed-circuit breathing apparatus in accordance with claim 8, wherein:

the fastening section is configured as a positive-locking fastening section for fastening to the counter-fastening of the breathing tube;

the fastening section comprises an inner surface defining a portion of the housing interior;

the positive-locking fastening section is positive-locking in at least some sections.

11. The closed-circuit breathing apparatus in accordance with claim 8, wherein the fastening section is formed on the housing mount and on the housing cover circumferentially all around or essentially all around the at least one passage opening, at least a portion of the fastening section being in contact with the breathing tube.

12. The closed-circuit breathing apparatus in accordance with claim 8, wherein the second partial section on the housing cover comprises a smaller configuration than the first partial section on the housing mount, wherein a portion of the breathing tube is located in the housing interior, the portion of the breathing tube being in direct contact with the at least one respirator component.

13. The closed-circuit breathing apparatus in accordance with claim 8, wherein a separation of the first partial section and the second partial section is configured as off-center in relation to a passage axis of the passage opening.

14. The closed-circuit breathing apparatus in accordance with claim 8, wherein the at least one passage opening is arranged in a projecting section, which projecting section protrudes from an outer housing wall of the housing cover or of the housing mount or of both the housing cover and the housing mount.

15. The closed-circuit breathing apparatus in accordance with claim 8, wherein the fastening section, in at least some sections thereof, comprises a radial projection extending circumferentially outwardly, the fastening section defining at least a portion of the at least one passage opening.

16. The closed-circuit breathing apparatus in accordance with claim 8, wherein:

the housing mount comprises another first partial section of a second passage opening for passage of another breathing tube into the housing interior;

the housing cover comprises another second partial section of said second passage opening; and said at least one passage opening and the second passage opening are identical or essentially identical passage openings.

17. A process for the assembly of a closed-circuit breathing apparatus comprising at least one respirator component, a breathing tube with at least a plurality of corrugations and a counter-fastening section and closed-circuit breathing apparatus housing comprising a housing mount and a housing cover, the housing mount and the cover cooperating to cover a housing interior, wherein the housing mount comprises a first partial section of at least one passage opening for passage of a breathing tube into the housing interior, the housing cover comprises a second partial section of said at least one passage opening, the housing mount or the housing cover or both the housing mount and the housing cover comprises a fastening section for mechanical fastening to the counter-fastening section of the breathing tube, which the breathing tube is guided through the at least one passage opening, the at least one respirator component is mounted in the housing interior, the at least one respirator component is fluid-communicatingly connected to the breathing tube and the counter-fastening section of the breathing tube is fastened to the fastening section of the housing, the breathing tube comprising a sealing section at one end of the breathing tube configured to fluid-tightly connect the breathing tube to the at least one respirator component, the process comprising the steps of:

inserting the breathing tube into the first partial section of the at least one passage opening in the housing mount;

arranging a union nut over an interior rib of the sealing section at the one end of the breathing tube and an external groove of the at least one respirator component in the housing interior;

providing a fastened connection between the fastening section and the counter-fastening section, the fastening section being adjacent to the sealing section and at least one of the corrugations, wherein at least a portion of the fastening section is attached to the breathing tube and the at least a portion of the fastening section is positioned within the counter-fastening section, the counter-fastening section being defined by a groove that is formed between two ridges of the plurality of corrugations; and closing of the housing with the housing cover, the fastening section being defined by an extent of both the housing mount and the housing cover.

* * * * *